United States Patent
Neemuchwala et al.

(10) Patent No.: US 7,881,540 B2
(45) Date of Patent: Feb. 1, 2011

(54) METHOD AND APPARATUS FOR DETECTION USING CLUSTER-MODIFIED GRAPH CUTS

(75) Inventors: Huzefa Neemuchwala, Mountain View, CA (US); Daniel Russakoff, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 1092 days.

(21) Appl. No.: 11/633,571

(22) Filed: Dec. 5, 2006

(65) Prior Publication Data

US 2008/0130978 A1    Jun. 5, 2008

(51) Int. Cl.
 G06K 9/62 (2006.01)
 G06K 9/34 (2006.01)
(52) U.S. Cl. .................... 382/225; 382/173
(58) Field of Classification Search ........... 382/173, 382/199, 204, 225, 228
See application file for complete search history.

(56) References Cited

U.S. PATENT DOCUMENTS

| 7,444,019 B2* | 10/2008 | Boykov et al. ............... 382/173 |
| 2006/0291721 A1* | 12/2006 | Torr et al. .................... 382/173 |
| 2008/0101678 A1* | 5/2008 | Suliga et al. ................. 382/132 |

OTHER PUBLICATIONS

Boykov et al., IEEE Transactions PAMI, vol. 26, No. 9, pp. 1124-1137, Sep. 2004.
Kwok et al., IEEE Transactions on Medical Imaging, vol. 23, No. 9, Sep. 2004, pp. 1129-1140.

* cited by examiner

*Primary Examiner*—Daniel G Mariam
(74) *Attorney, Agent, or Firm*—Birch, Stewart, Kolasch & Birch, LLP

(57) ABSTRACT

A method and an apparatus process images. The method according to one embodiment accesses digital image data representing an image including an object; clusters pixels of the image to obtain clusters; generates a graph with pixels of the image and cluster membership information of pixels in the clusters; and segments the graph using a max-flow segmentation to obtain pixels of the image associated with the object.

19 Claims, 14 Drawing Sheets

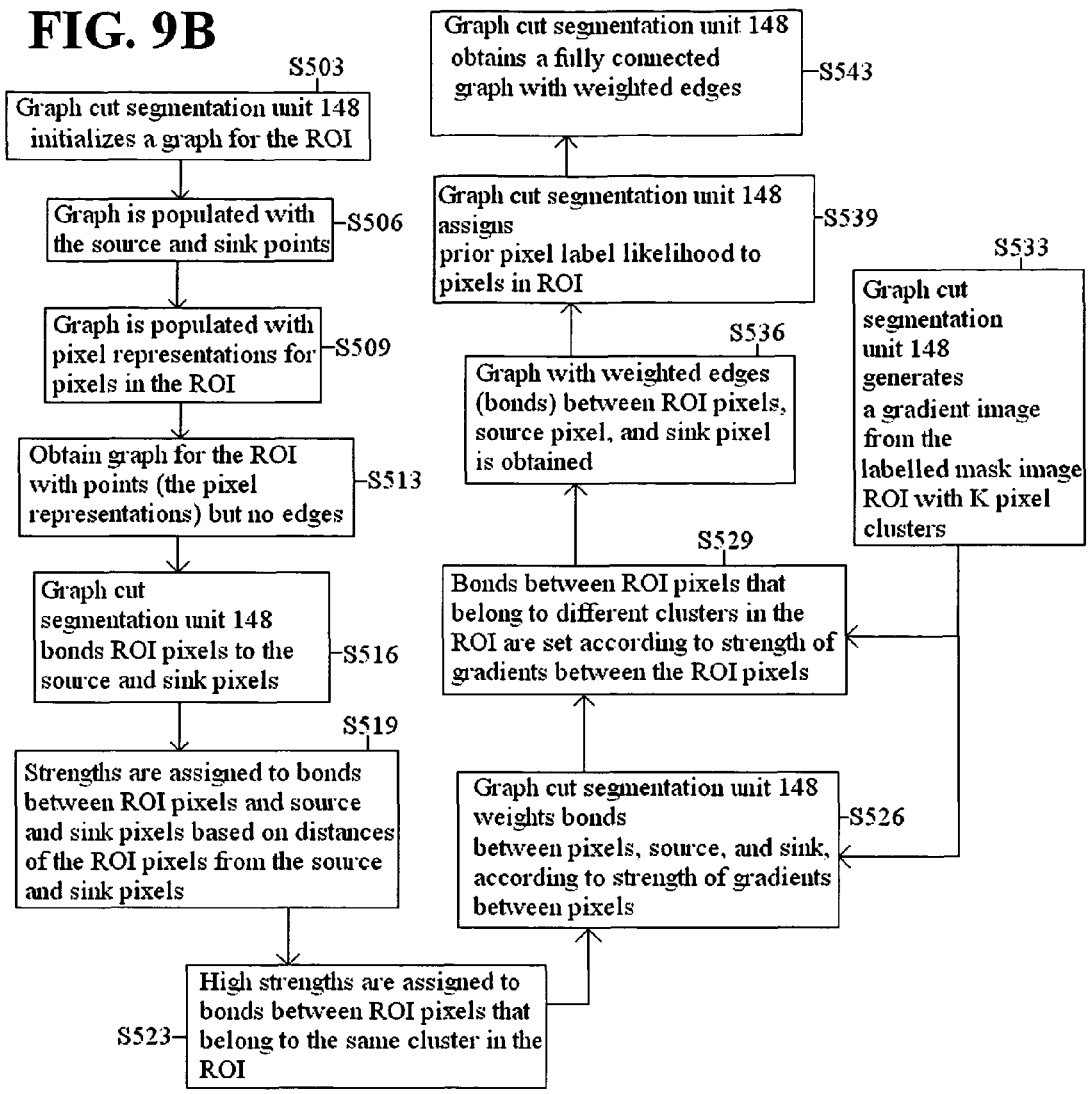

ROI from cropping unit 128 mask image ROI with 4 classes of pixels pectoral muscle mask image

I711  I701  I713  I703  I715  I705 — M707

— M717

— M727

I721  I723  I725

ROI from cropping unit 128 mask image ROI with 4 classes of pixels pectoral muscle mask image

I741   I731
I743   I733
I745   I735   M737

M747

METHOD AND APPARATUS FOR DETECTION USING CLUSTER-MODIFIED GRAPH CUTS

CROSS REFERENCE TO RELATED APPLICATION

This non-provisional application is related to co-pending non-provisional application titled "Method and Apparatus for Detection Using Gradient-Weighted and/or Distance-Weighted Graph Cuts" filed concurrently herewith, the entire contents of which are hereby incorporated by reference.

BACKGROUND OF THE INVENTION

1. Field of the Invention

The present invention relates to a digital image processing technique, and more particularly to a method and apparatus for processing and segmenting areas in images.

2. Description of the Related Art

Mammography images are powerful tools used in the diagnosis of medical problems of breasts. An important feature in mammography images is the pectoral muscle area. The pectoral muscle area can be used to identify breast abnormalities, can facilitate comparative analysis and processing of mammography images, can convey significant information relating to breast position and deformation, etc.

For example, the pectoral muscle in the medio-lateral view, as is typically shown in mammograms, is a major landmark for mammogram reconstruction and registration. The pectoral muscle also helps quantify quality of mammograms and can be used for automatic quality assurance. The area overlying the pectoral muscle is a highly suspicious zone for development of masses and is checked by radiologists for false-negatives (non-cancerous areas). Also, mammographic parenchymal patterns, which are a marker of breast cancer risk, and the pectoral muscle have identical texture, which leads to false-positives in detection of malignant masses.

Pectoral muscle identification is a non-trivial task due to variability of borders and contrast, and unclear areas in breast images. Typical/conventional methods to detect the pectoral muscle rely on some heuristic gradient measures to fit a line to the pectoral muscle boundary. One such pectoral muscle detection technique is described in the publication "Automatic Pectoral Muscle Segmentation on Mediolateral Oblique View Mammograms", by S. Kwok, R. Chandrasekhar, Y. Attikiouzel and M. Rickard, IEEE Transactions on Medical Imaging v.23 No. 9, September 2004. In the technique described in this publication, an adaptive algorithm is proposed to automatically extract the pectoral muscle in digitized mammograms. The adaptive algorithm uses knowledge about the position and shape of the pectoral muscle on medio-lateral oblique views. The pectoral edge is first estimated by a straight line that is validated for correctness of location and orientation. The linear estimate is then refined using iterations. This technique, however, relies on detailed pre-operational knowledge of the digital data, to tune algorithms for the data at hand, and requires adjustments of many parameters. This technique force-fits a line or curve to the pectoral muscle boundary, even though the boundary may not be amenable to curve fitting.

Disclosed embodiments of this application address these and other issues by using a method and an apparatus for pectoral muscle detection using cluster-modified graph cuts. The method and apparatus segment graphs associated with breast images, to obtain pixels associated with the pectoral muscle. The method and apparatus segment graphs associated with breast images by incorporating clustering results for pixels into graph segmentation. The method and apparatus are applicable to breast images with various views, and do not require tuning beforehand. The method and apparatus are applicable to other types of images besides breast images, and detect various objects included in images.

SUMMARY OF THE INVENTION

The present invention is directed to a method and an apparatus for processing images. According to a first aspect of the present invention, an image processing method comprises: accessing digital image data representing an image including an object; clustering pixels of the image to obtain clusters; generating a graph with pixels of the image and cluster membership information of pixels in the clusters; and segmenting the graph using a max-flow segmentation to obtain pixels of the image associated with the object.

According to a second aspect of the present invention, an image processing method comprises: accessing digital image data representing an image including an object; clustering pixels of the image to obtain clusters; generating a graph with pixels of the image and cluster membership information of pixels in the clusters; and segmenting the graph using an energy minimizing function, to obtain pixels of the image associated with the object.

According to a third aspect of the present invention, an apparatus for processing images comprises: an image data input unit for accessing digital image data representing an image including an object; a clustering unit for clustering pixels of the image to obtain clusters; and a graph segmentation unit for identifying pixels of the image associated with the object, the graph segmentation unit identifying pixels by generating a graph with pixels of the image and cluster membership information of pixels in the clusters, and segmenting the graph using a max-flow segmentation to obtain pixels of the image associated with the object.

BRIEF DESCRIPTION OF THE DRAWINGS

Further aspects and advantages of the present invention will become apparent upon reading the following detailed description in conjunction with the accompanying drawings, in which:

FIG. 9B is a flow diagram illustrating exemplary operations for creating a graph for a region of interest by a graph cut segmentation unit included in an image processing unit for detection using cluster-modified graph cuts according to an embodiment of the present invention illustrated in FIG. 8;

DETAILED DESCRIPTION

Figure 1:
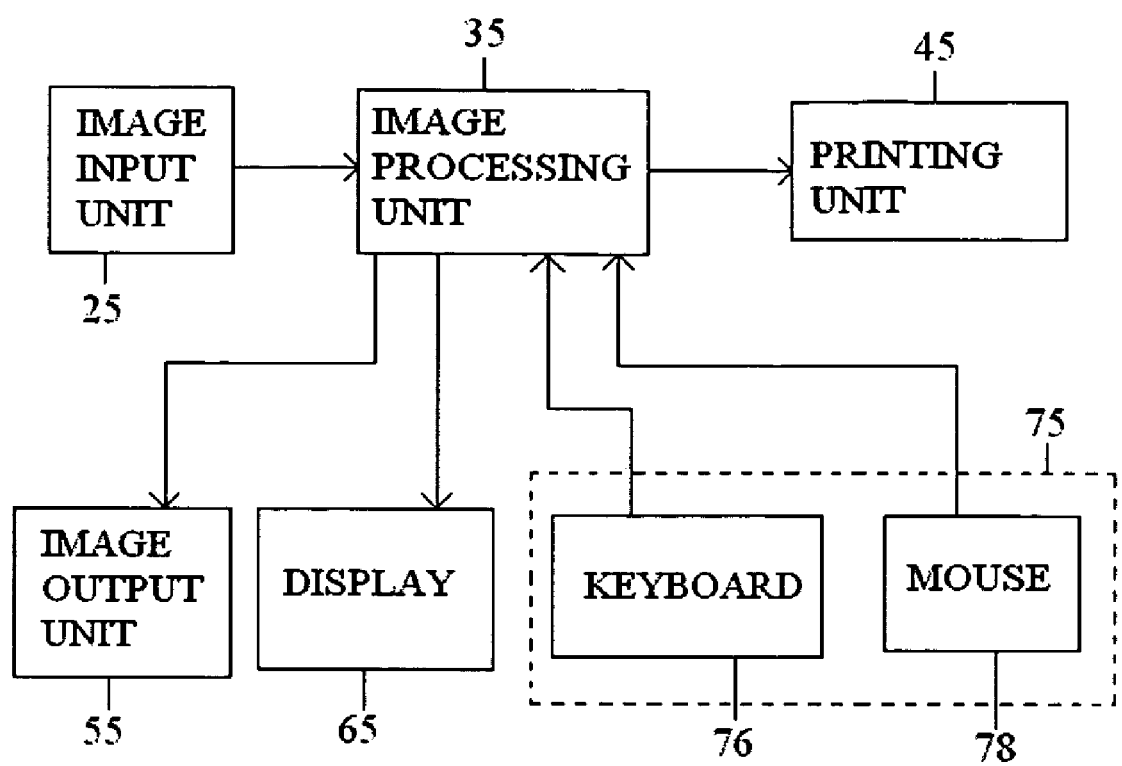
FIG. 1 is a general block diagram of a system including an image processing unit for detection using cluster-modified graph cuts according to an embodiment of the present invention.

Aspects of the invention are more specifically set forth in the accompanying description with reference to the appended figures. FIG. 1 is a general block diagram of a system including an image processing unit for detection using cluster-modified graph cuts according to an embodiment of the present invention. The system 105 illustrated in FIG. 1 includes the following components: an image input unit 25; an image processing unit 35; a display 65; an image output unit 55; a user input unit 75; and a printing unit 45. Operation of the system 105 in FIG. 1 will become apparent from the following discussion.

The image input unit 25 provides digital image data. The digital image data may be a medical image, a mammography image, an image of people, etc. Image input unit 25 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

The image processing unit 35 receives digital image data from the image input unit 25 and performs object detection using cluster-modified graph cuts in a manner discussed in detail below. A user, e.g., a radiology specialist at a medical facility, may view the output of image processing unit 35, via display 65 and may input commands to the image processing unit 35 via the user input unit 75. In the embodiment illustrated in FIG. 1, the user input unit 75 includes a keyboard 76 and a mouse 78, but other conventional input devices can also be used.

In addition to performing detection using cluster-modified graph cuts in accordance with embodiments of the present invention, the image processing unit 35 may perform additional image processing functions in accordance with commands received from the user input unit 75. The printing unit 45 receives the output of the image processing unit 35 and generates a hard copy of the processed image data. In addition or as an alternative to generating a hard copy of the output of the image processing unit 35, the processed image data may be returned as an image file, e.g., via a portable recording medium or via a network (not shown). The output of image processing unit 35 may also be sent to image output unit 55 that performs further operations on image data for various purposes. The image output unit 55 may be a module that performs further processing of the image data, a database that collects and compares images, etc.

Figure 2:
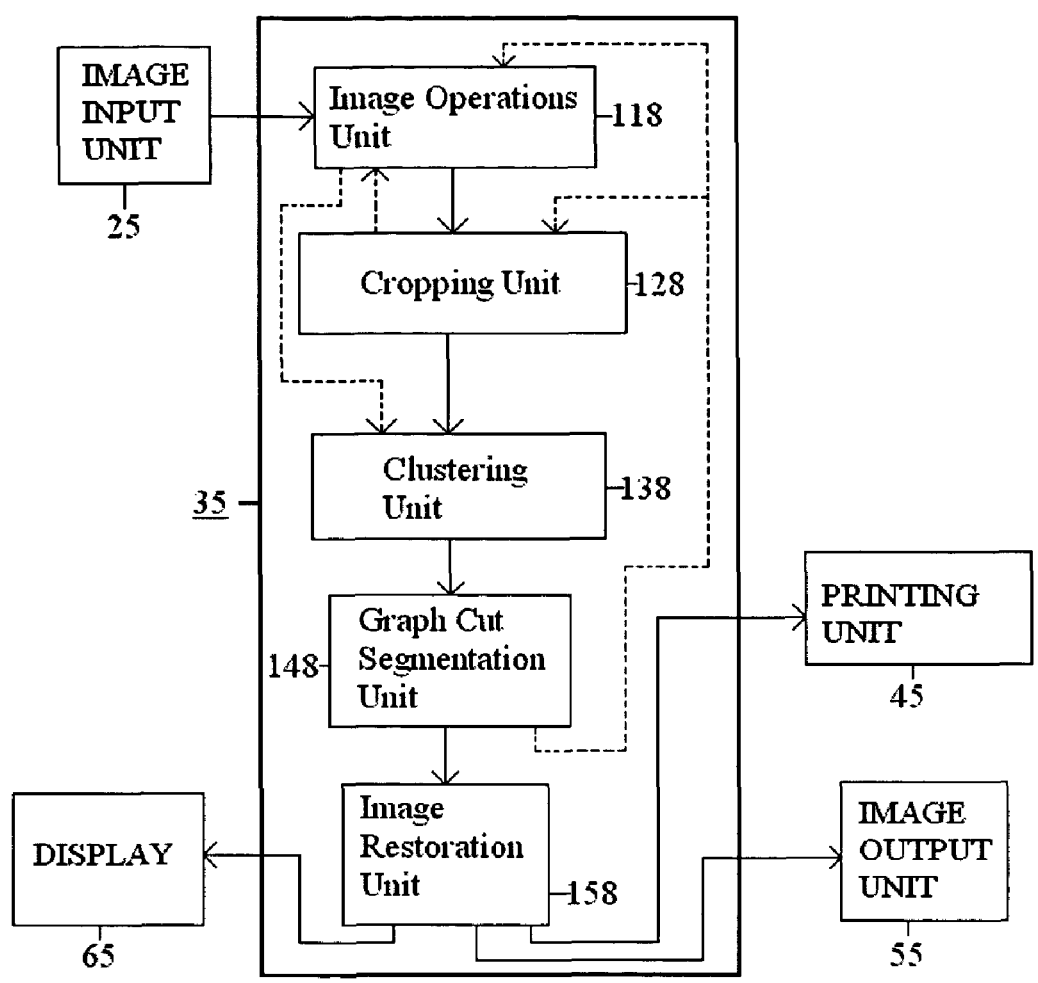
FIG. 2 is a block diagram illustrating in more detail aspects of the image processing unit for detection using cluster-modified graph cuts according to an embodiment of the present invention.

FIG. 2 is a block diagram illustrating in more detail aspects of the image processing unit 35 for detection using cluster-modified graph cuts according to an embodiment of the present invention. As shown in FIG. 2, the image processing unit 35 according to this embodiment includes: an image operations unit 118; a cropping unit 128; a clustering unit 138; a graph cut segmentation unit 148; and an image restoration unit 158. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 35 illustrated in FIG. 2 performs preprocessing and preparation of digital image data, clustering of pixels in the digital image data, and detection of various areas in the digital image data using graphs generated from pixels and clusters of digital image data. Operation of image processing unit 35 will be next described in the context of mammography images, for detection of pectoral muscle areas. However, the principles of the current invention apply equally to other areas of image processing, and to detection of other types of objects in digital image data.

Image operations unit 118 receives a mammography image from image input unit 25 and may perform preprocessing and preparation operations on the mammography image. Preprocessing and preparation operations performed by image operations unit 118 may include resizing, cropping, compression, color correction, etc., that change size and/or appearance of the mammography image.

Image operations unit 118 sends the preprocessed mammography image to cropping unit 128, which crops a part of the mammography image. Cropping unit 128 may send the cropped section of the mammography image back to image operations unit 118 for more image processing operations.

Clustering unit 138 receives a cropped section of the mammography image and determines clusters associated with the cropped section. Graph cut segmentation unit 148 next builds a graph using pixels and clusters in the cropped section, and segments the graph to obtain an area of the pectoral muscle in the mammography image. Finally, image restoration unit 158 outputs a breast image with identified pectoral muscle pixels. Image restoration unit 158 may also send results of pectoral area segmentation back to cropping unit 128 or to image operations unit 118, for refinement of detection results.

The output of image restoration unit 158 may be sent to image output unit 55, printing unit 45, and/or display 65. Operation of the components included in the image processing unit 35 illustrated in FIG. 2 will be next described with reference to FIGS. 3-10.

Image operations unit 118, cropping unit 128, clustering unit 138, graph cut segmentation unit 148, and image restoration unit 158 are software systems/applications. Image operations unit 118, cropping unit 128, clustering unit 138, graph cut segmentation unit 148, and image restoration unit 158 may also be purpose built hardware such as FPGA, ASIC, etc.

Figure 3:
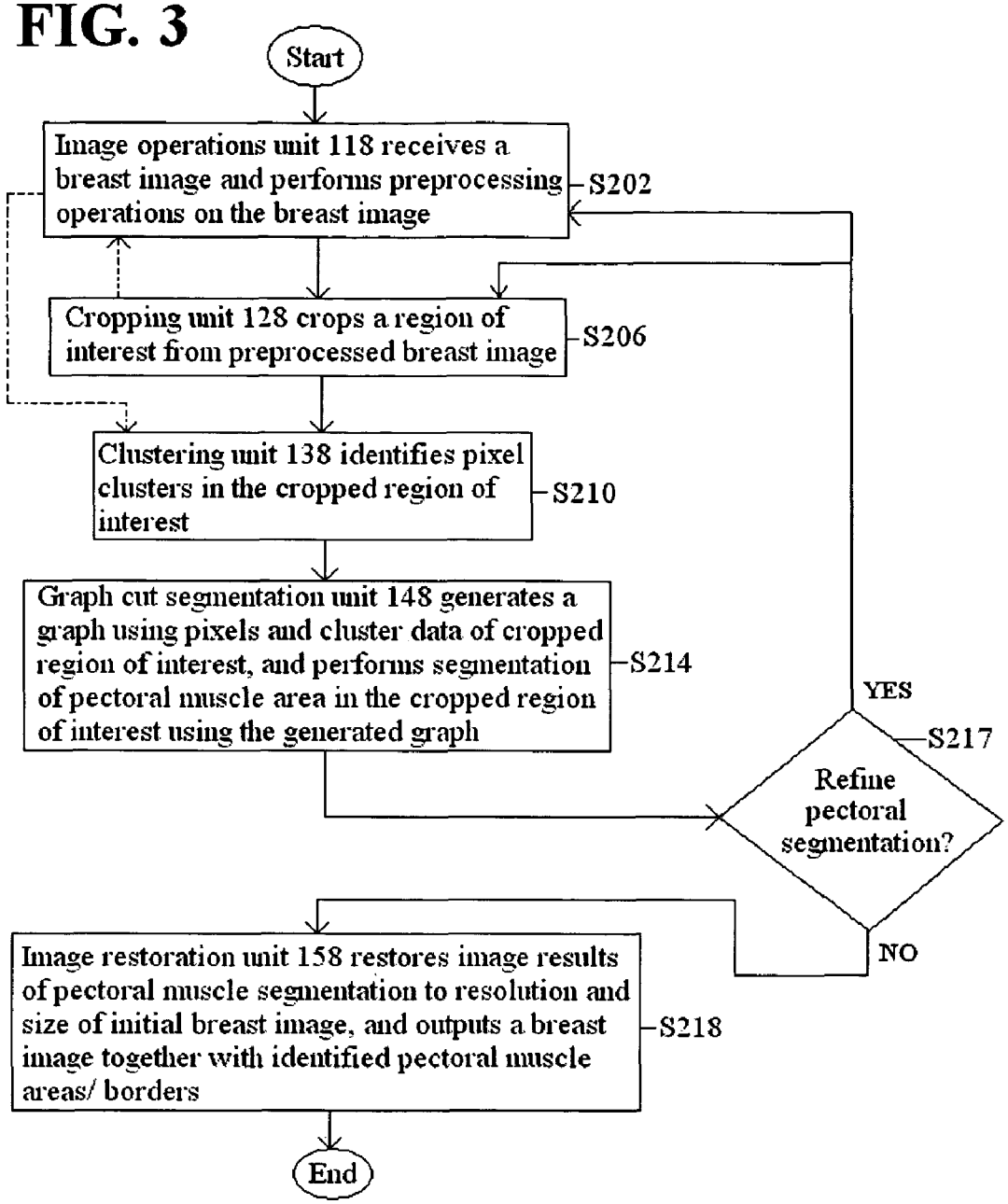
FIG. 3 is a flow diagram illustrating operations performed by an image processing unit for detection using cluster-modified graph cuts according to an embodiment of the present invention illustrated in FIG. 2.

FIG. 3 is a flow diagram illustrating operations performed by an image processing unit 35 for detection using cluster-modified graph cuts according to an embodiment of the present invention illustrated in FIG. 2. Image operations unit 118 receives a raw or a preprocessed breast image from image input unit 25, and performs preprocessing operations on the breast image (S202). Preprocessing operations may include resizing, smoothening, compression, color correction, etc. Cropping unit 128 receives the preprocessed breast image and crops a region of interest from the preprocessed breast image (S206). The cropped region of interest is then sent to clustering unit 138. The cropped region of interest may instead be sent back to image operations unit 118 for more preprocessing operations, after which it is sent to clustering unit 138. Clustering unit 138 identifies pixel clusters in the cropped region of interest (S210). Graph cut segmentation unit 148 receives the cropped region of interest with clusters identified by clustering unit 138, generates a graph using the pixels and the cluster data for the cropped region of interest, and performs segmentation of the pectoral muscle area in the cropped region of interest, using the generated graph (S214). Segmentation of the pectoral muscle area in the cropped region of interest places pixels from the cropped region of interest into sets. Some of the sets are associated with the pectoral muscle, while other sets are associated with non-muscle areas, such as breast areas, background areas, etc.

Graph cut segmentation unit 148 then performs a test to determine whether a refinement of the pectoral segmentation is to be performed, based on the current segmentation results (S217). If a refinement of the pectoral segmentation is to be performed, the cropped region of interest is sent back to cropping unit 128 or to image operations unit 118. Cropping unit 128 may then crop a different region of interest from the breast image, image operations unit 118 may perform additional or new image processing operations on the breast image or on the region of interest, clustering unit 138 may cluster pixels in the region of interest again. Graph cut segmentation unit 148 then performs segmentation of the pectoral muscle area again.

Image restoration unit 158 receives the image results of pectoral muscle segmentation from graph cut segmentation unit 148, restores the received image to the resolution and size of the initial breast image, and outputs a breast image together with identified pectoral muscle areas/borders (S218). The output of image restoration unit 158 may be sent to image output unit 55, printing unit 45, and/or display 65.

Figure 4:
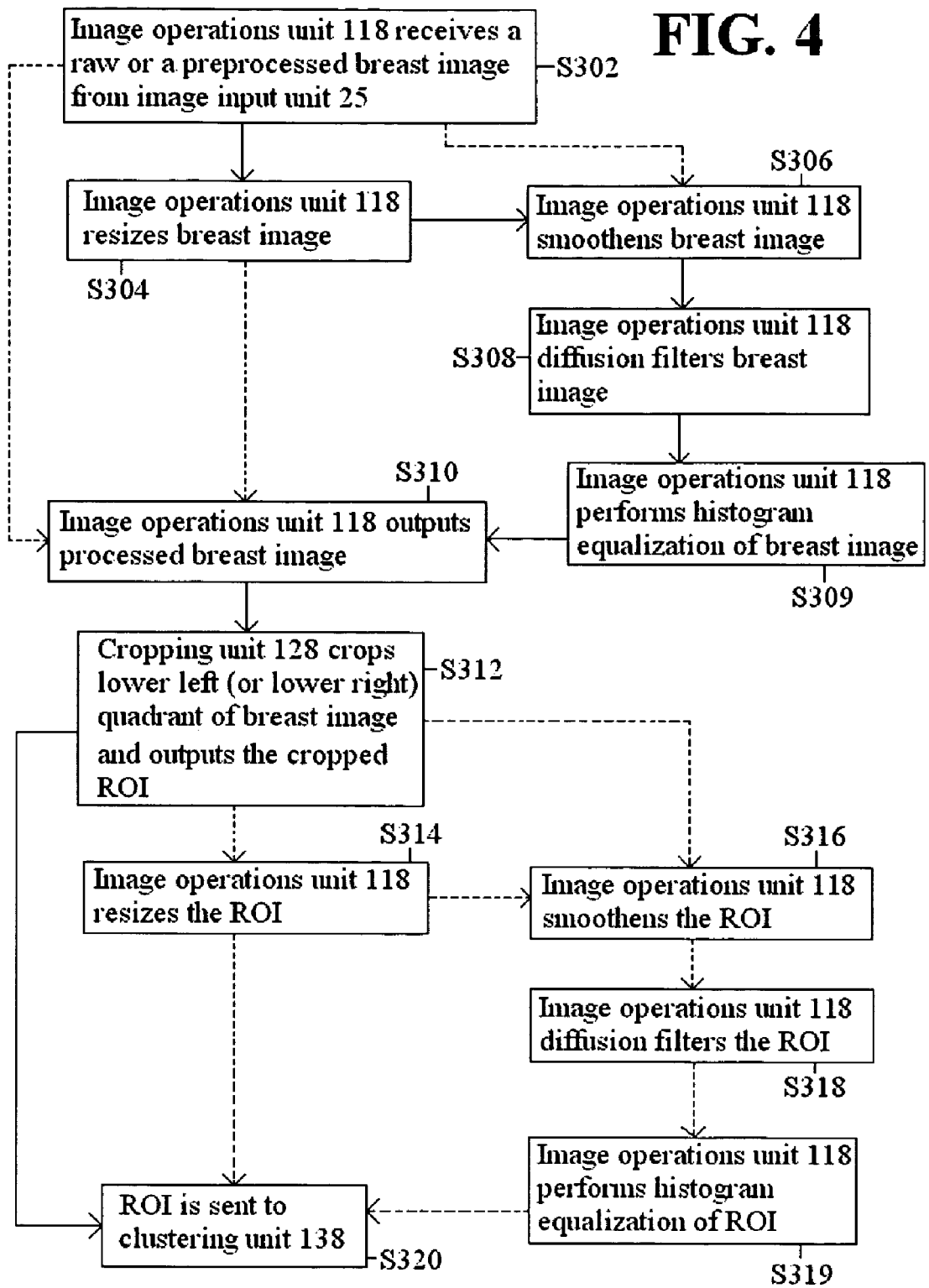
FIG. 4 is a flow diagram illustrating image processing operations performed by an image operations unit and a cropping unit included in an image processing unit for detection using cluster-modified graph cuts according to an embodiment of the present invention illustrated in FIG. 2.

FIG. 4 is a flow diagram illustrating image processing operations performed by an image operations unit 118 and a cropping unit 128 included in an image processing unit 35 for detection using cluster-modified graph cuts according to an embodiment of the present invention illustrated in FIG. 2. The flow diagram in FIG. 4 illustrates exemplary details of steps S202 and S206 from FIG. 3.

Image operations unit 118 receives a raw or a preprocessed breast image from image input unit 25 (S302) and resizes the breast image (S304) in order to speed up subsequent processing of the breast image. In an exemplary implementation, mammogram images at 100 um resolution received by image operations unit 118 are resized to 800 um. The resized breast image is then smoothened by image operations unit 118 to reduce noise (S306), diffusion filtered to avoid loss of high spatial frequency information (S308), and histogram equalized (S309). Image operations unit 118 then outputs a processed breast image (S310). Cropping unit 128 receives the processed breast image from image operations unit 118, and crops a section of the processed breast image where the pectoral muscle is likely to be located (S312). For mammograms showing MLL/MLR views of the breast, the lower left or lower right portion/quadrant of the breast image is cropped out, as the pectoral muscle is located in one of these areas. In an exemplary set of mammograms, the cropped lower left or lower right area spans about ½ height and ⅓ width of the total mammogram image. For other views of mammograms, different sections of the breast image may be cropped. The cropped area is the region of interest (ROI) output by cropping unit 128. The ROI is then sent to clustering unit 138 (S320).

Alternative sequences for processing of the breast image may also be performed. For example, steps S304, S306, S308 and S309 may be skipped for the full breast image, with resizing, smoothening, diffusion filtering, and histogram equalization performed for the ROI image, in steps S314 (resizing of ROI), S316 (smoothening of ROI), S318 (diffusion filtering of ROI), and S319 (histogram equalization of the ROI). In another sequence, resizing can be performed for the full breast image (S304), with smoothening, diffusion filtering, and histogram equalization performed for the ROI image (S316, S318, S319). In another sequence, smoothening, diffusion filtering, and histogram equalization can be performed for the full breast image (S306, S308 and S309), with resizing performed for the ROI image (S314). In yet another sequence, resizing and/or smoothening, diffusion filtering, and histogram equalization may be performed for both the full breast image and the ROI image. In an exemplary implementation, the original breast image, or the ROI image is smoothened with a 3×3 Gaussian window to reduce shot noise (steps S306 or S316). At the end of the sequences shown in FIG. 4, the ROI is sent to clustering unit 138 (S320).

In an exemplary implementation, the ROI resolution is reduced to 1/16th of its original resolution, in step S314.

Figure 5A:
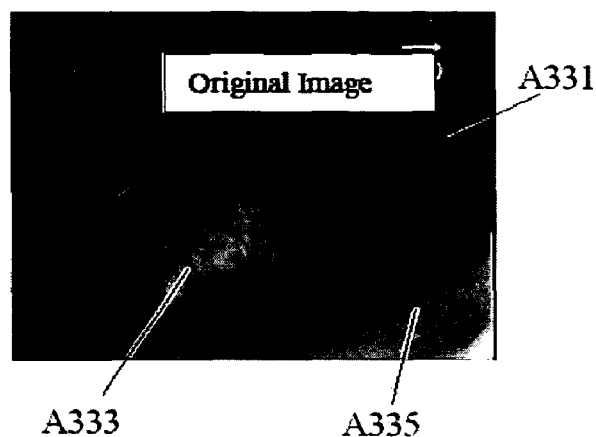
FIG. 5A illustrates an exemplary mammogram image.

FIG. 5A illustrates an exemplary mammogram image. The breast image I330 in FIG. 5A illustrates a breast and a pectoral muscle section visible in the breast image. In the breast image I330, A333 is a breast area, A335 is an area of the pectoral muscle, and A331 is the background.

Figure 5B:
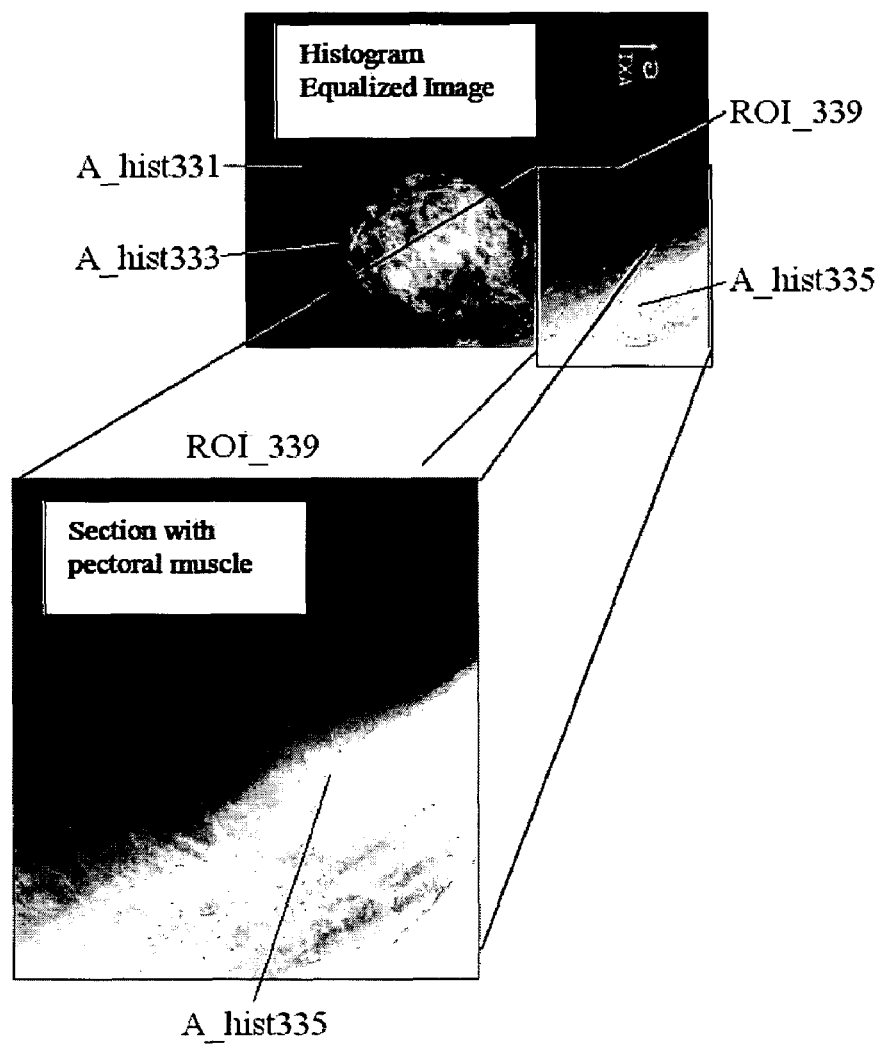
FIG. 5B illustrates exemplary mammogram images obtained after image processing operations and cropping according to an embodiment of the present invention illustrated in FIG. 4.

FIG. 5B illustrates exemplary mammogram images obtained after image processing operations and cropping according to an embodiment of the present invention illustrated in FIG. 4. The mammogram images shown in FIG. 5B are outputs of image operations unit 118 and cropping unit 128 for the input breast image I330 of FIG. 5A.

Breast image I338 is output from image operations unit 118 after histogram equalization of original image I330. In the histogram equalized breast image I338, A_hist333 is the breast area after histogram equalization, A_hist335 is the pectoral muscle area after histogram equalization, and A_hist331 is the background. Cropping unit 128 next crops a region of interest ROI_339 from histogram equalized image 1338. The region of interest ROI_339 is chosen to include the pectoral muscle area A_hist335. ROI_339 is magnified at the bottom of FIG. 5B, to show the area of the pectoral muscle A_hist335.

Figure 6:
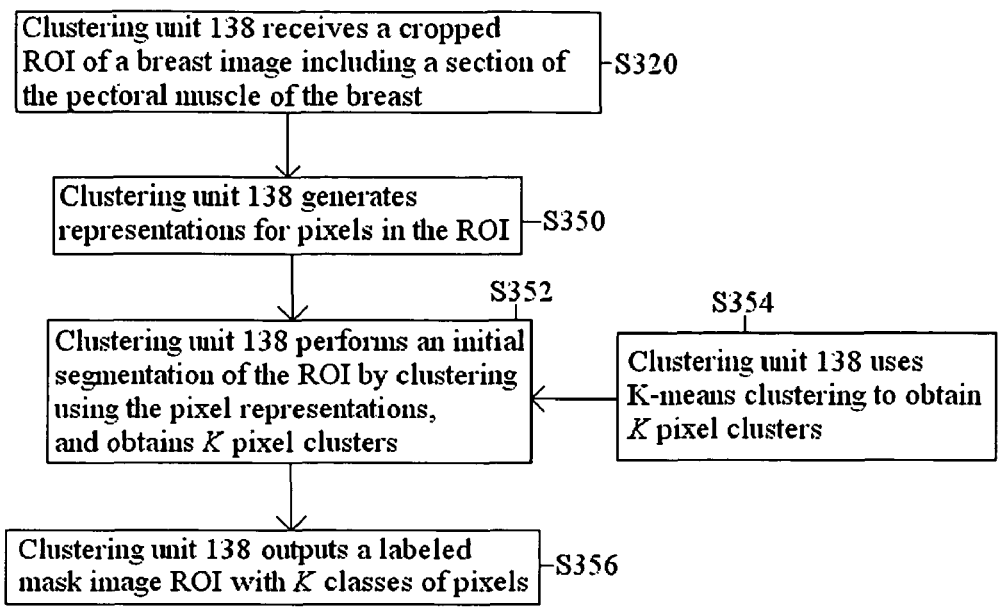
FIG. 6 is a flow diagram illustrating operations performed by a clustering unit included in an image processing unit for detection using cluster-modified graph cuts according to an embodiment of the present invention illustrated in FIG. 2.

FIG. 6 is a flow diagram illustrating operations performed by a clustering unit 138 included in an image processing unit 35 for detection using cluster-modified graph cuts according to an embodiment of the present invention illustrated in FIG. 2. The flow diagram in FIG. 6 describes details of step S210 in FIG. 3.

Clustering unit 138 receives a cropped region of interest (ROI) of a breast image from cropping unit 128 or from image operations unit 118, as described in FIG. 4. The ROI includes an area of the breast image with a section of the pectoral muscle of the breast. Clustering unit 138 generates representations for the pixels in the ROI (S350). Clustering unit 138 next performs an initial segmentation of the ROI by clustering, using the pixel representations, and obtains K clusters of pixels (S352). Clustering unit 138 outputs a labeled mask image ROI with K classes of pixels (S356) and sends the labeled mask image to graph cut segmentation unit 148.

In one exemplary implementation, K-means clustering was used in step S352 to obtain pixel clusters (S354).

Figure 7:
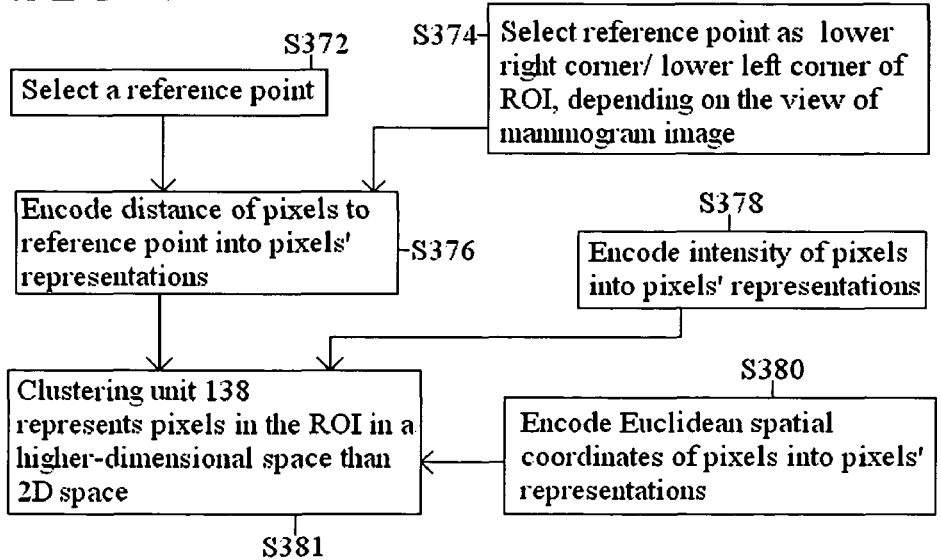
FIG. 7 is a flow diagram illustrating exemplary operations for representation of pixels for a region of interest by a clustering unit included in an image processing unit for detection using cluster-modified graph cuts according to an embodiment of the present invention illustrated in FIG. 6.

FIG. 7 is a flow diagram illustrating exemplary operations for representation of pixels for a region of interest by a clustering unit 138 included in an image processing unit 35 for detection using cluster-modified graph cuts according to an embodiment of the present invention illustrated in FIG. 6. The flow diagram in FIG. 7 illustrates exemplary details of step S350 from FIG. 6.

In an exemplary implementation, pixels in the ROI are represented in a higher-dimensional space than the 2D representation in image space (S381). In this higher-dimensional space, pixels' representations encode more properties of pixels, besides the intensity of pixels. A pixel can, for example, be represented in a 4-dimensional space by Euclidean spatial coordinates, intensity, and distance from a reference point (S380, S378, S376, S372). The reference point can be the lower right corner or the lower left corner of the ROI, depending on the view of the mammogram image from which the ROI was extracted (S374). The reference point may be chosen as a pixel likely to belong to the pectoral muscle. 4-dimensional pixel representations are then obtained for all pixels in the ROI.

The Euclidean spatial coordinates may be x and y coordinates, polar coordinates, cylindrical coordinates, etc. Other higher or lower dimensional representations of pixels, which encode more properties/parameters or fewer properties/parameters of pixels than the pixel properties/parameters mentioned above, may also be obtained.

Clustering unit 138 then uses the pixel representation and performs K-means clustering in an exemplary implementation, as described in step S354 in FIG. 6. In one implementation, K-means clustering divides the group of 4-dimensional pixel representations into clusters such that a distance metric relative to the centroids of the clusters is minimized. 4-dimensional pixel representations are assigned to clusters and then the positions of the cluster centroids are determined. The value of the distance metric to be minimized is also determined. Some of the 4-dimensional pixel representations are then reassigned to different clusters for distance metric minimization. New cluster centroids are determined, and the distance metric to be minimized is calculated again. The reassigning procedure for 4-dimensional pixel representations is continued to refine the clusters, i.e., to minimize the distance metric relative to the centroids of the clusters. Convergence in the K-means clustering method is achieved when no pixel changes its cluster membership.

In the context of clustering (and K-means) clustering the first two dimensions in the 4-dimensional pixel representations, namely the Euclidean spatial coordinates, enforce a spatial relationship of pixels that belong to the same cluster. Hence, pixels that belong to the same cluster have similar Euclidean spatial coordinates values in the 4D space spanned of the 4D representations. The Euclidean spatial coordinates may be the x-location and y-location of pixels, a combination of the x-location and y-location coordinates, polar or cylindrical coordinates values, or other spatial coordinates. The third dimension in the 4D pixel representations, namely the intensity value of pixels, enforces the fact that pixels that belong to the same cluster are typically similar in intensity. Finally, the 4th dimension in the 4D pixel representations, namely the distance of pixels to a reference point, introduces a smoothness constraint about the reference point. The smoothness constraint relates to the fact that pectoral muscle shapes and breast shapes are typically smoothly varying about the reference point.

K-means clustering of the pixels is performed to ease the segmentation process performed by graph cut segmentation unit 148. Instead of K-means clustering, other clustering methods may be used. Clustering reduces the number of pixel classes from the number of pixels to the number K of clusters obtained by clustering unit 138.

In an exemplary implementation, K-means clustering with K=4 clusters is performed, so that pixels are placed in one of four clusters in the labeled mask image output in step S356 in FIG. 6. In another exemplary implementation, K-means clustering with K=3 clusters is performed, so that pixels are placed in one of three clusters in the labeled mask image output in step S356 in FIG. 6.

Clustering unit 138 may perform K-means clustering of pixels using methods described in the US patent application titled "Method and Apparatus for Breast Border Detection", by D. Russakoff and A. Hasegawa, filed on Mar. 3, 2006, the entire contents of which are hereby incorporated by reference. Thresholds for pixel intensities/difference of pixel intensities/breast pixel intensities/breast pixel gradient intensities, etc., defined based on empirical evidence of mammography images, may be used in clustering. Methods for determining such thresholds are described in the above listed US patent application "Method and Apparatus for Breast Border Detection".

Other versions of K-means clustering, or other clustering methods may also be used by clustering unit 138.

Figure 8:
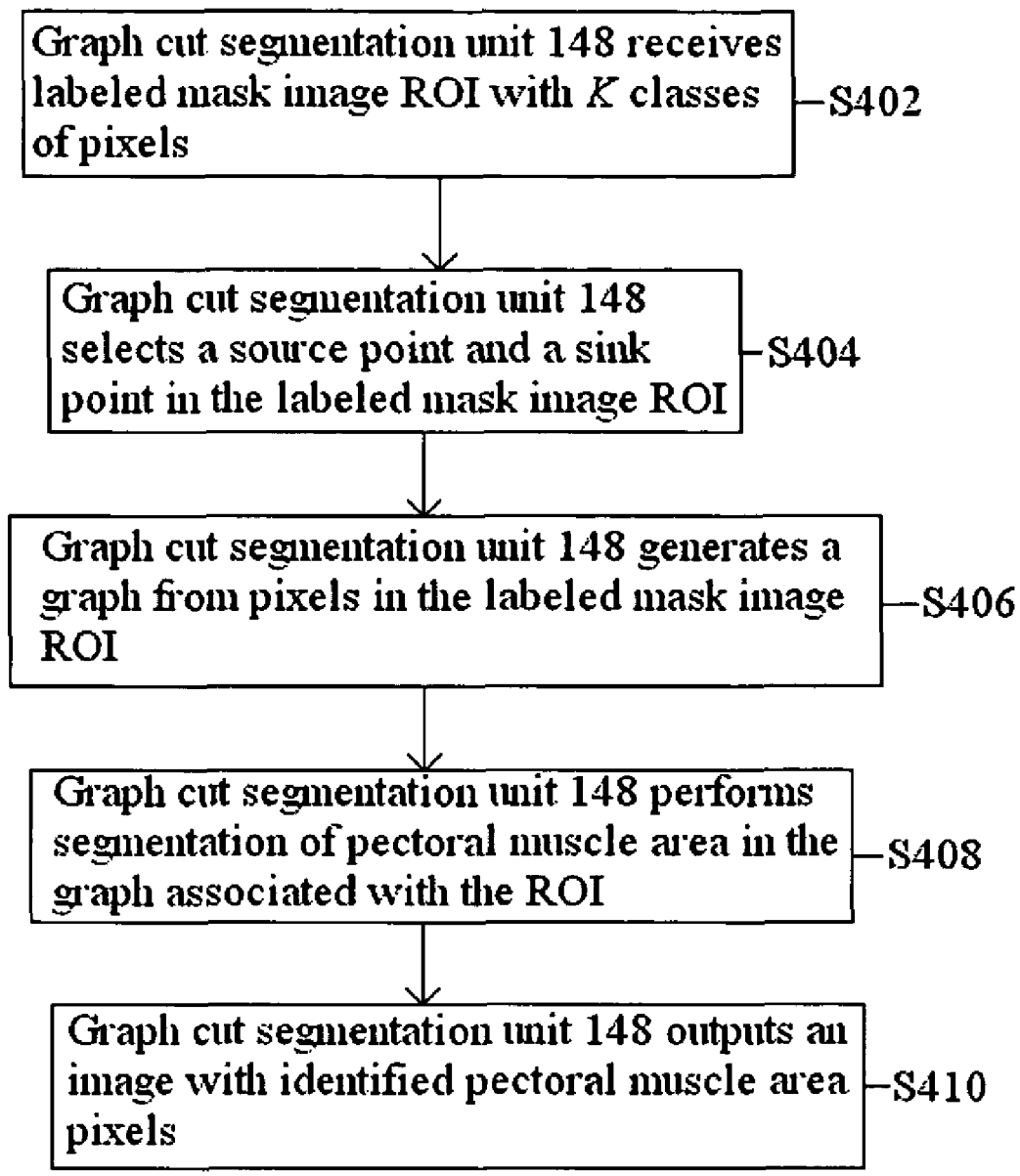
FIG. 8 is a flow diagram illustrating operations performed by a graph cut segmentation unit included in an image processing unit for detection using cluster-modified graph cuts according to an embodiment of the present invention illustrated in FIG. 2.

FIG. 8 is a flow diagram illustrating operations performed by a graph cut segmentation unit 148 included in an image processing unit 35 for detection using cluster-modified graph cuts according to an embodiment of the present invention illustrated in FIG. 2. The flow diagram in FIG. 8 describes details of step S214 from FIG. 3.

Graph cut segmentation unit 148 receives from clustering unit 138 the labeled mask image ROI with K classes (clusters) of pixels. Graph cut segmentation unit 148 next selects a source point and a sink point in the labeled mask image ROI (S404). Graph cut segmentation unit 148 then generates a graph from the pixels in the labeled mask image ROI (S406). Next, graph cut segmentation unit 148 performs segmentation of the pectoral muscle area in the graph associated with the ROI (S408), and outputs an image with identified pectoral muscle area pixels (S410).

Figure 9A:
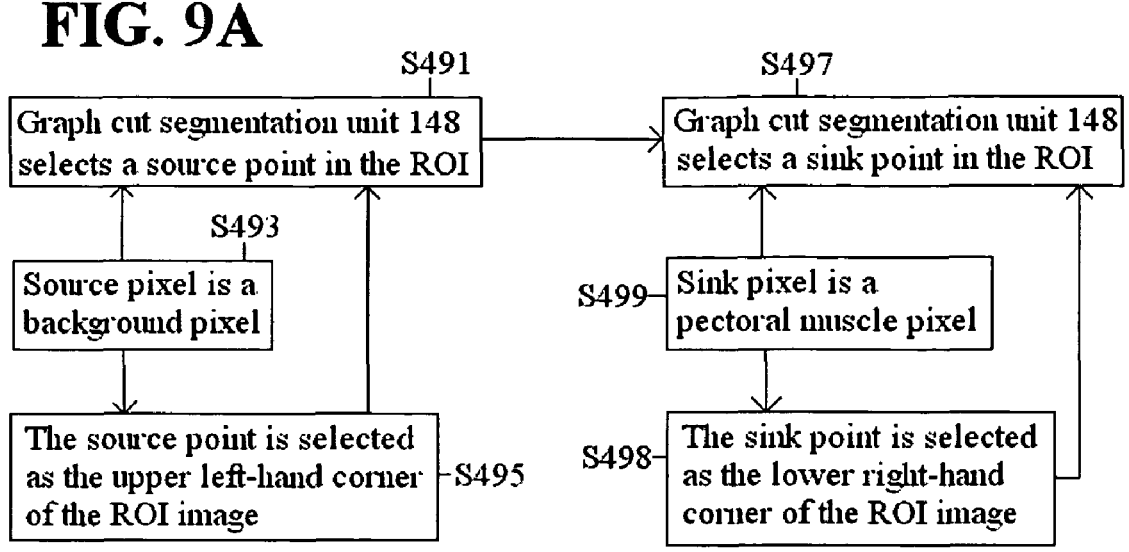
FIG. 9A is a flow diagram illustrating exemplary operations for selection of a source point and a sink point in a region of interest by a graph cut segmentation unit included in an image processing unit for detection using cluster-modified graph cuts according to an embodiment of the present invention illustrated in FIG. 8.

FIG. 9A is a flow diagram illustrating exemplary operations for selection of a source point and a sink point in a region of interest by a graph cut segmentation unit 148 included in an image processing unit 35 for detection using cluster-modified graph cuts according to an embodiment of the present invention illustrated in FIG. 8. The flow diagram in FIG. 9A illustrates exemplary details of step S404 from FIG. 8.

To isolate the pectoral muscle from the background in a breast image, image processing unit 35 can cut the image along the pectoral muscle boundary. While this may be achieved by following local gradients, the resulting pectoral muscle segmentation may be poor. To obtain a better segmentation of the pectoral muscle, a global perspective that follows the physical contours of the pectoral muscle can be used. The representation of pixels obtained in FIG. 7 and the pixel clustering results are used in the determination of contours of the pectoral muscle, because isolating the pectoral muscle can be reduced to isolating the pixels in the pectoral muscle in the pixel representation space, such as, for example, a 4-dimensional pixel representation space.

The analogy of water flowing from a mountaintop to a lake in a valley can be used for segmentation of objects. Flowing water follows the path of least resistance, where a maximum flow can be achieved. Similarly, segmentation of objects can be driven from a source (an arbitrary pixel in the background) to a sink (an arbitrary spot in the pectoral muscle). The source and sink can be interchanged without consequences for the resulting segmentation.

Graph cut segmentation unit 148 selects a source pixel and a sink pixel in the ROI (S491 and S497). The source pixel can be automatically selected as a pixel that is most likely a background pixel and not a pectoral muscle pixel (S493). The sink pixel can be automatically selected as a pixel that is most likely a pectoral muscle pixel (S499). For example, in breast images shown in FIGS. 5A and 5B, and breast images showing similar views to the views in FIGS. 5A and 5B, the source point can be selected as the upper left-hand corner of the ROI image (S495), and the sink point can be selected as the lower right-hand corner of the ROI image (S498).

FIG. 9B is a flow diagram illustrating exemplary operations for creating a graph for a region of interest by a graph cut segmentation unit 148 included in an image processing unit 35 for detection using cluster-modified graph cuts according to an embodiment of the present invention illustrated in FIG. 8. The flow diagram in FIG. 9B illustrates exemplary details of step S406 from FIG. 8.

Graph cut segmentation unit 148 initializes a graph for the region of interest (S503). The graph is first populated with the source and sink pixels (S506) obtained in step S404 of FIG. 8, or, in an exemplary implementation, the source and sink points obtained as shown in FIG. 9A. The graph is then populated with the pixel representations for the pixels in the ROI (S509). Graph cut segmentation unit 148 uses the pixel representations generated in step S350 of FIG. 6 for the ROI pixels together with the source and sink pixels. In an exemplary implementation, graph cut segmentation unit 148 uses the 4D pixel representations derived as described in FIG. 7, for the ROI pixels together with the source and sink pixels. At this point, the graph for the ROI contains points, or nodes (the pixel representations) but no edges (S513).

Graph cut segmentation unit 148 next bonds each ROI pixel to the source and sink pixels (S516). Strengths are assigned to the bonds between ROI pixels and the source and sink pixels (S519). The strength of a bond (link or edge) between an ROI pixel and the source pixel is determined based on the distance of the ROI pixel from the source pixel. The strength of a bond (link or edge) between an ROI pixel and the sink pixel is determined based on the distance of the ROI pixel from the sink pixel.

Figure 9C:
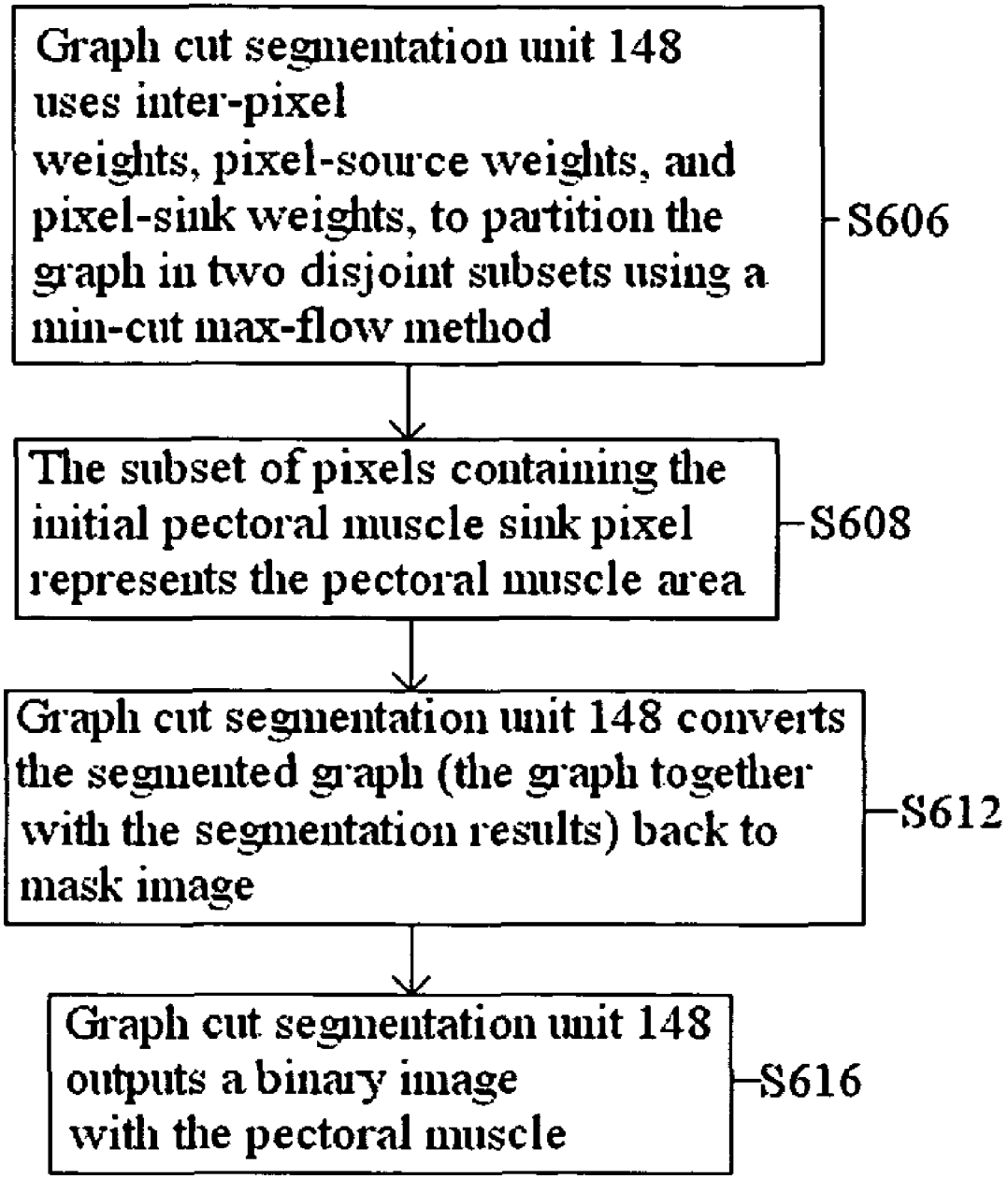
FIG. 9C is a flow diagram illustrating segmentation operations performed by a graph cut segmentation unit included in an image processing unit for detection using cluster-modified graph cuts according to an embodiment of the present invention illustrated in FIG. 8.

Segmentation of the pectoral muscle area in the ROI, which is described in FIG. 9C, will place pixels from the ROI into pixel groups, where some of the pixel groups will be associated with the pectoral muscle, while other groups will be associated with non-muscle areas, such as non-muscle breast areas, background areas, etc. The strength of bonds between pixels and source and sink pixels, based on distances of ROI pixels to source and sink pixels describe the fact that the closer a ROI pixel is to the source pixel, the more likely it is that the ROI pixel is in the same group as the source pixel. Similarly, the closer a ROI pixel is to the sink pixel, the more likely it is that the ROI pixel is in the same group as the sink pixel.

The pixel clustering results, output by clustering unit 138, are used by graph cut segmentation unit 148 to generate bonds between pixels. Bonds between pixels of the same classes, that is, belonging to the same cluster, are set to have high strengths, so that the bonds are not examined or broken by the segmentation algorithm in step S408 in FIG. 8 (S523).

The strengths of bonds between ROI pixels, sink pixel and source pixel are weighted according to the strength of the gradient between ROI pixels (S526). Graph cut segmentation unit 148 also creates bonds between ROI pixels that belong to different clusters (S529). The bonds between ROI pixels that belong to different clusters (inter-pixel bonds) are set according to the weight of the gradient between pixels (inter-pixel gradients). Additionally, or alternatively, spatial distances and gradients may be used together, to form a measure of inter-pixel distance in a higher dimensional space.

Gradients between pixels are determined by generating a gradient image from the labeled mask image ROI with K pixel clusters (S533). The gradient image is generated using the pixel intensity information in the original mammogram. The gradient image contains the gradient values between pixels. The gradient image is then used together with the labeled mask image ROI image to weight the strength of the bonds between pixels. The gradient is calculated between two pixels (between the pixels individual intensities) only if the cluster labels for the two pixels are different. If two pixels have the same cluster label, the gradient between them is set to 0. With this technique, the edges between clusters of pixels are maintained.

After inter-pixel bonds, and bonds to source and sink have been calculated, a graph with weighted edges (bonds) between ROI pixels, source pixel, and sink pixel is obtained (S536).

Next, graph cut segmentation unit 148 assigns prior pixel label likelihood to pixels in ROI (S539). Prior pixel likelihoods are obtained by a mathematical relationship between the pixel location and the source (or sink). A pixel is more likely to be a source (or sink) if it is physically closer to the source (sink). If 'L' represents the prior likelihood of the pixel being of the same class as source, that is, of the class of background pixels, then '1/L' is the likelihood that the pixel is of the same class as the sink. To calculate L (prior likelihood for the pixel belonging to class 'source'), let ds be the distance between pixel and source, and dx be the distance between source and sink. Then L=(ds/dx). Since dx>0 and ds>0, L>0 and 1/L<infinity.

A fully connected graph with weighted edges is obtained (S543).

FIG. 9C is a flow diagram illustrating segmentation operations performed by a graph cut segmentation unit 148 included in an image processing unit 35 for detection using cluster-modified graph cuts according to an embodiment of the present invention illustrated in FIG. 8. The flow diagram in FIG. 9B illustrates exemplary details of step S408 from FIG. 8.

A min-cut max-flow method may be used to segment the ROI by finding the cheapest cut (max flow) from the source node to the sink node and obtain an area of pectoral muscle in the ROI. The min-cut max-flow algorithm uses the inter-pixel bond weights, the pixel-source, and pixel-sink bond weights to arrive at a segmentation of the ROI (S606) with a global maximum flow. The algorithm cuts edges (breaks bonds) between pixels, to obtain a group of pixels that belong to the pectoral muscle.

Bonds between pixels belonging to the same cluster are set to be very high so that they are not examined or broken by the max-flow algorithm. The output of graph cut segmentation unit 148 after performing the min-cut max-flow algorithm is a ROI in which pixels have been assigned to two groups, with one group of pixels representing the pectoral muscle, while the other group of pixels is associated with features not related to the pectoral muscle, such as the breast and the background.

Graph cut segmentation unit 148 may perform min-cut max-flow segmentation of the ROI using methods described in "An Experimental Comparison of Min-Cut/Max-Flow Algorithms for Energy Minimization in Vision", by Y. Boykov and V. Kolmogorov, IEEE Transactions on PAMI, v. 26 No. 9, pp 1124-1137, September 2004, the entire contents of which are hereby incorporated by reference. As discussed in the above publication, a cut C on a graph with two terminals is a partitioning of the nodes in the graph into two disjoint subsets S and T such that the source s is in S and the sink t is in T. Such a cut C is also knows as an s/t cut. The cost of a cut C={S,T} is defined as the sum of the costs of "boundary" edges (p,q), where p∈S and q∈T. The minimum cut problem on a graph is to find a cut that has the minimum cost among the possible cuts. In combinatorial optimization it has been shown that the minimum s/t cut problem can be solved by finding a maximum flow from the source s to the sink t. Using an analogy, a maximum flow is a maximum "amount of water" that can be sent from a source to a sink by interpreting graph edges as directed "pipes" with capacities equal to edge weights.

In the case of ROI from breast images showing the pectoral muscle, when the sink t is a pectoral muscle pixel, the subset T is the set of pixels that belong to the pectoral muscle (S608). In that case, the source s is a background pixel, and the subset S is the set of pixels that do not belong to the pectoral muscle, so subset S includes pixels from the breast, the background, etc.

Graph cut segmentation unit 148 next converts the segmented graph obtained (the graph together with the segmentation results) back to a mask image (S612), and outputs a binary image showing the pectoral muscle (S616). The binary image is sent to image restoration unit 158.

In alternative embodiments, graph cut segmentation unit 148 may segment the ROI using other energy minimizing functions besides, or instead of a min-cut/max-flow segmentation.

Figure 10:
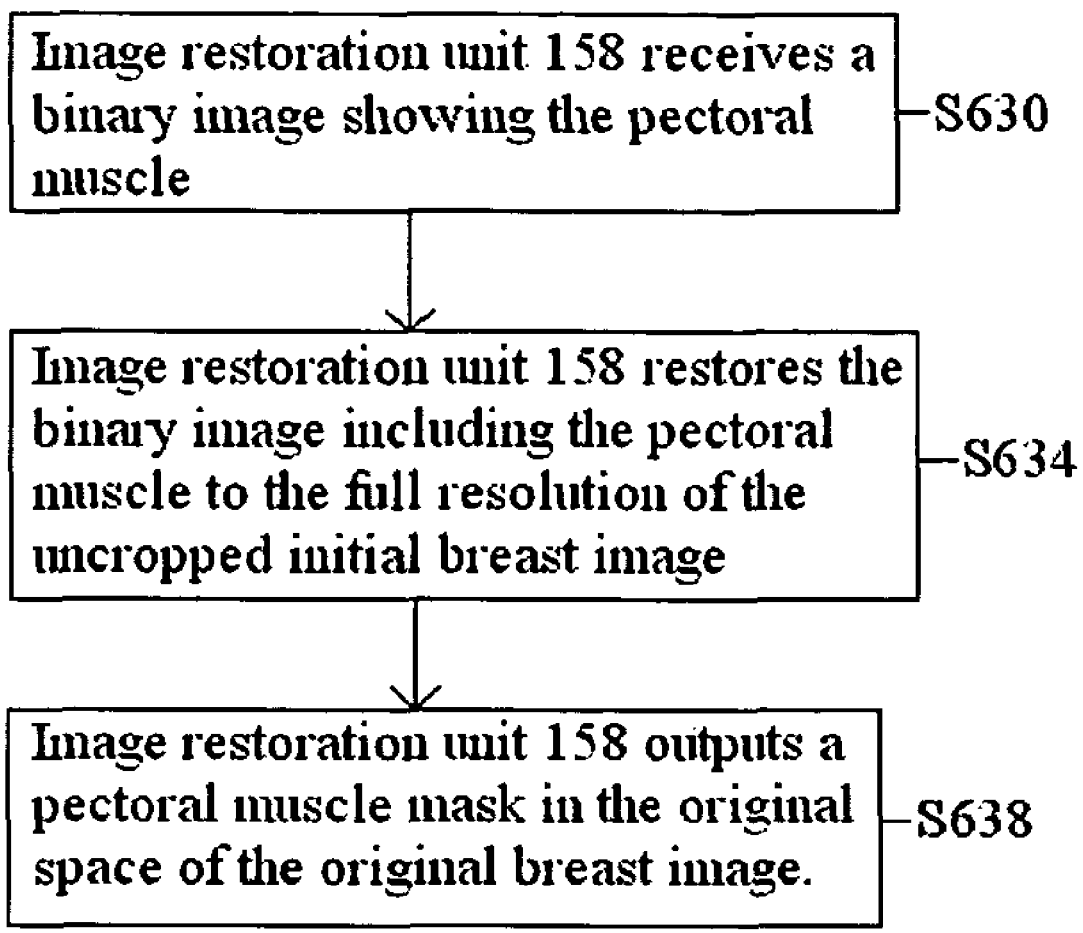
FIG. 10 is a flow diagram illustrating operations performed by an image restoration unit included in an image processing unit for detection using cluster-modified graph cuts according to an embodiment of the present invention illustrated in FIG. 2.

FIG. 10 is a flow diagram illustrating operations performed by an image restoration unit 158 included in an image processing unit 35 for detection using cluster-modified graph cuts according to an embodiment of the present invention illustrated in FIG. 2. Image restoration unit 158 receives a binary image showing the pectoral muscle from graph cut segmentation unit 148. The binary image corresponds to the ROI that was extracted from the initial breast image. Image restoration unit 158 restores the binary image including the pectoral muscle to the full resolution of the uncropped initial breast image, and outputs a pectoral muscle mask in the original space of the original breast image. The results of image restoration unit 35 may be sent to printing unit 45, image output unit 55, and/or display 65.

Figure 11A:
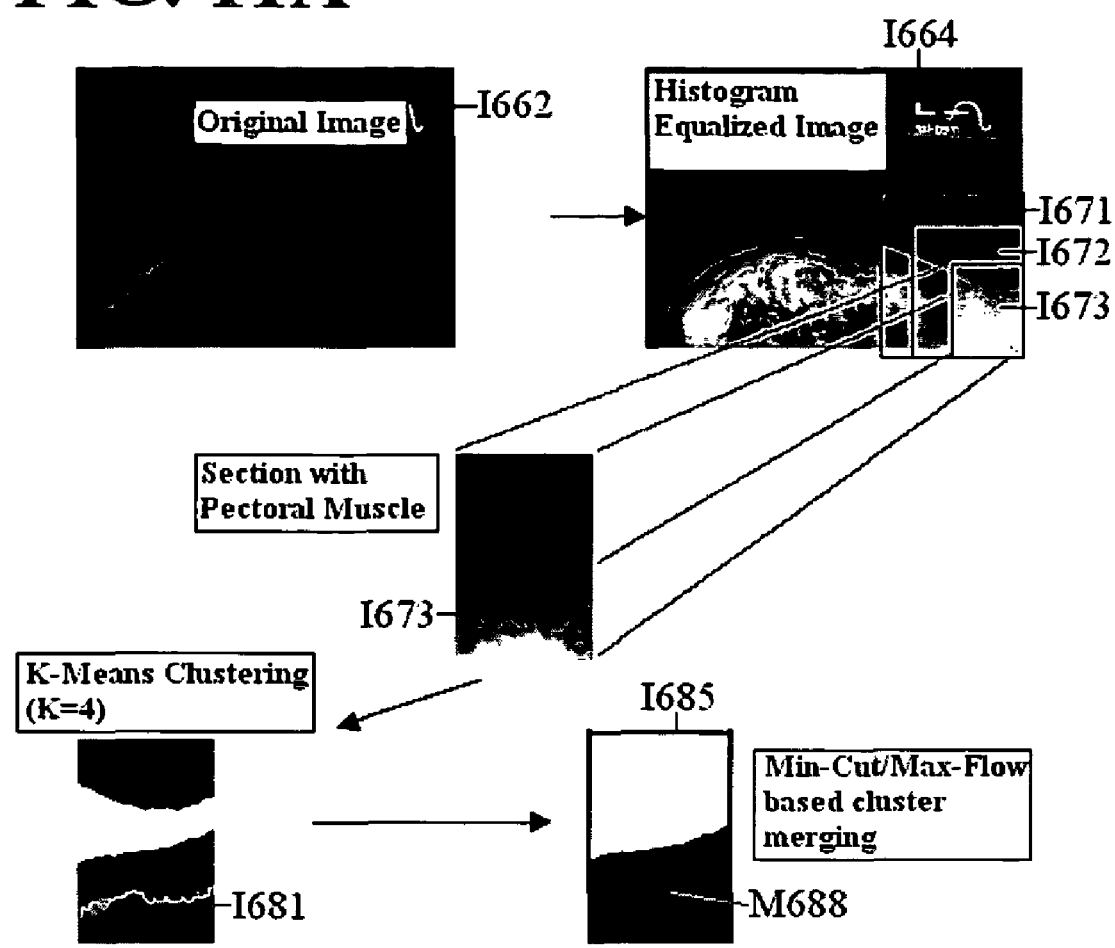
FIG. 11A illustrates an exemplary flow and exemplary outputs of an image processing unit for detection using cluster-modified graph cuts according to an embodiment of the present invention illustrated in FIG. 2.

FIG. 11A illustrates an exemplary flow and exemplary outputs of an image processing unit 35 for detection using cluster-modified graph cuts according to an embodiment of the present invention illustrated in FIG. 2. An original mammogram image I662 is input into image operations unit 118. Processed histogram equalized image I664 is output by image operations unit 118. ROIs I671, I672 and I673 are successively cropped by cropping unit 128, with ROI I673 being selected for pectoral muscle segmentation. Clustering unit 138 performs K-means clustering for I673 with K=4, and outputs the mask image ROI I681 with 4 classes of pixels. Graph cut segmentation unit 148 performs pectoral muscle segmentation and obtains binary image I685 showing the pectoral muscle. The limited number of pixel clusters and edges between clusters greatly reduces the algorithm complexity, in terms of time and memory, to obtain the binary image I685 showing the pectoral muscle. Binary image I685 may then be integrated back into original image I662.

Figure 11B:
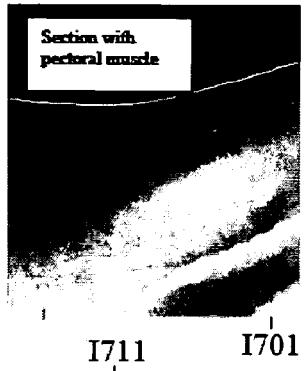
FIGS. 11B and 11C illustrate exemplary outputs of an image processing unit for detection using cluster-modified graph cuts according to an embodiment of the present invention illustrated in FIG. 2.
Figure 11B:
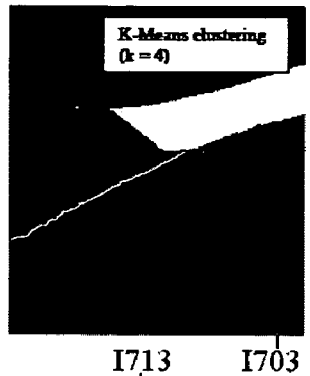
Figure 11B:
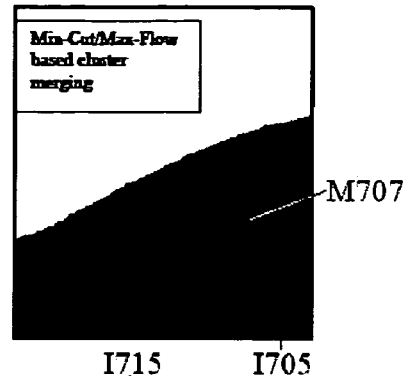
Figure 11B:
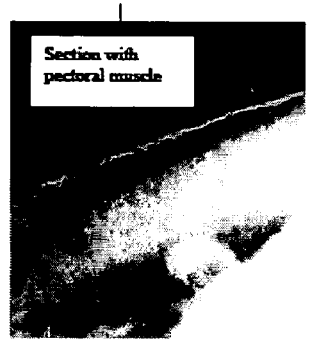
Figure 11B:
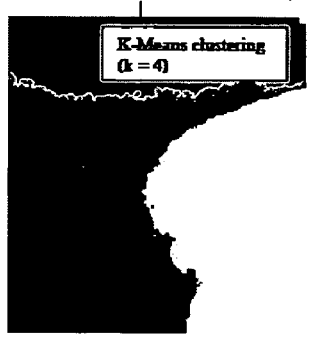
Figure 11B:
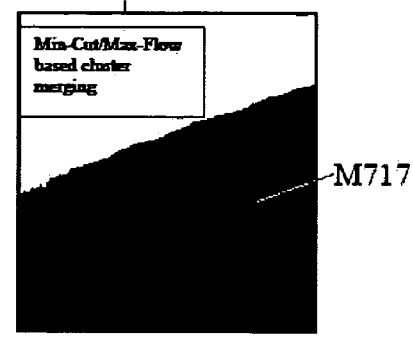
Figure 11B:
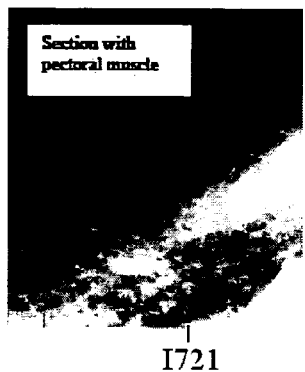
Figure 11B:
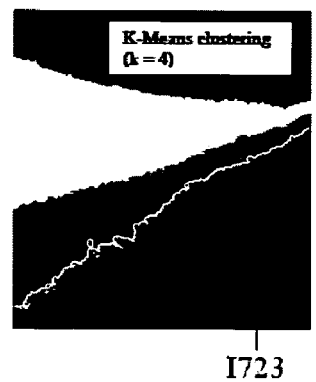
Figure 11B:
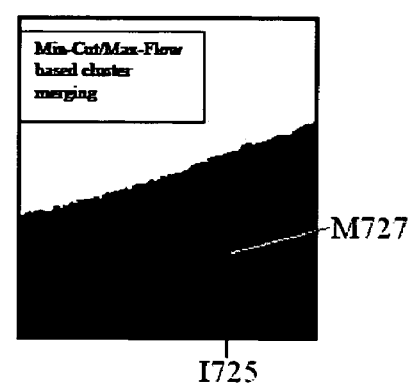
Figure 11C:
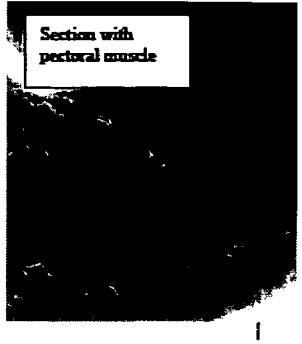
Figure 11C:
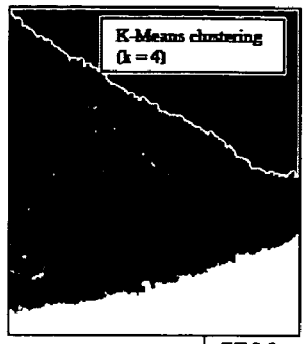
Figure 11C:
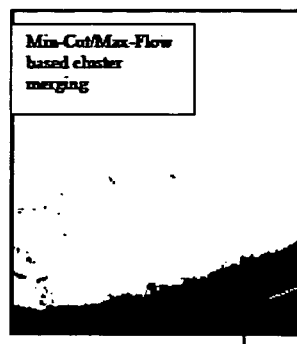
Figure 11C:
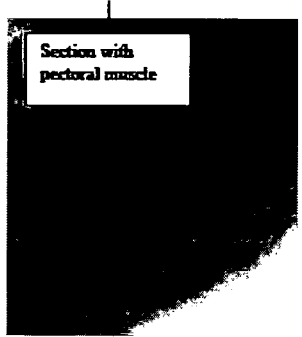
Figure 11C:
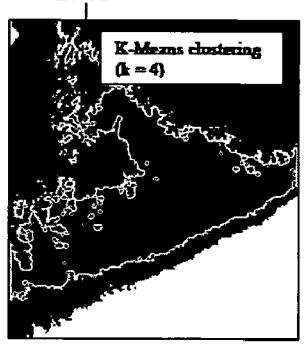
Figure 11C:
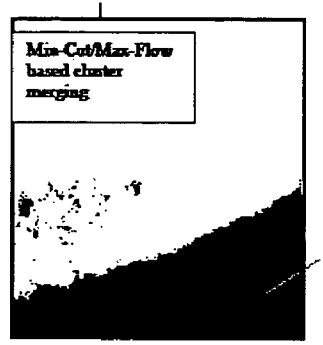

FIGS. 11B and 11C illustrate exemplary outputs of an image processing unit 35 for detection using cluster-modified graph cuts according to an embodiment of the present invention illustrated in FIG. 2. The first column of pictures illustrates ROIs output from cropping unit 128. The second column of pictures illustrates mask image ROIs with 4 pixel classes, obtained by K-means clustering with K=4. The third column of pictures illustrates pectoral muscle mask images obtained by graph cut segmentation unit 148, for the ROIs in column 1. In the third column of images, the areas of dark pixels labeled M707, M717, M727, M737, and M747 represent areas of the pectoral muscle.

Although aspects of the present invention have been described in the context of mammography images, it should be realized that the principles of the present invention are applicable to other types of digital images besides mammography images, for detection of various other types of objects besides pectoral muscles.

Although detailed embodiments and implementations of the present invention have been described above, it should be apparent that various modifications are possible without departing from the spirit and scope of the present invention.

We claim:

1. An image processing method, said method comprising:
   accessing digital image data representing an image including an object;
   clustering pixels of said image to obtain clusters;
   generating a graph with pixels of said image and cluster membership information of pixels in said clusters; and
   segmenting said graph using a max-flow segmentation to obtain pixels of said image associated with said object, wherein
   said generating step includes said cluster membership information in said graph by assigning a high strength to edges between same-cluster pixels, wherein said same-cluster pixels belong to a cluster from said clusters, and said segmenting step does not break said edges between said same-cluster pixels.

2. An image processing method, said method comprising:
   accessing digital image data representing an image including an object;
   clustering pixels of said image to obtain clusters;

generating a graph with pixels of said image and cluster membership information of pixels in said clusters; and segmenting said graph using a max-flow segmentation to obtain pixels of said image associated with said object, wherein said generating step assigns weights to edges between different-cluster pixels based on a gradient characteristic between said different-cluster pixels, wherein said different-cluster pixels belong to different clusters.

3. An image processing method, said method comprising:

accessing digital image data representing an image including an object;

clustering pixels of said image to obtain clusters;

generating a graph with pixels of said image and cluster membership information of pixels in said clusters; and segmenting said graph using a max-flow segmentation to obtain pixels of said image associated with said object, wherein said step of clustering pixels of said image is performed using k-means clustering, said step of k-means clustering including:

representing pixels of said image in a 4-dimensional space using two parameters relating to spatial characteristics of said pixels in said image, a parameter relating to an intensity characteristic of said pixels in said image, and a parameter relating to a distance characteristic of said pixels in said image to a reference point, to obtain pixel representations, and performing k-means clustering for said pixels of said image in said 4-dimensional space.

4. The image processing method as recited in claim 3, wherein said step of k-means clustering uses k=4 to obtain 4 said clusters.

5. An image processing method, said method comprising:

accessing digital image data representing an image including an object;

clustering pixels of said image to obtain clusters;

generating a graph with pixels of said image and cluster membership information of pixels in said clusters; and segmenting said graph using a max-flow segmentation to obtain pixels of said image associated with said object, wherein said generating step includes selecting a source pixel from among pixels of said image not included in said object, and a sink pixel from among pixels of said image included in said object, and wherein said generating step includes assigning strengths to edges between said pixels in said graph, said sink pixel, and said source pixel, based on a distance characteristic.

6. The image processing method as recited in claim 5, wherein said generating step includes said cluster membership information in said graph by assigning a high strength to edges between same-cluster pixels, wherein said same-cluster pixels belong to a cluster from said clusters, and assigning weights to edges between different-cluster pixels based on a gradient characteristic between said different-cluster pixels, wherein said different-cluster pixels belong to different clusters; and said segmenting step segments a first group of pixels associated with said object and including said sink pixel, a second group of pixels not associated with said object and including said source pixel, without breaking said edges between said same-cluster pixels.

7. The image processing method as recited in claim 5, wherein said image is a digital mammogram, said object is a pectoral muscle in said digital mammogram, said source pixel is a background pixel, said sink pixel is a pixel of said pectoral muscle.

8. An image processing method, said method comprising:

accessing digital image data representing an image including an object;

clustering pixels of said image to obtain clusters;

generating a graph with pixels of said image and cluster membership information of pixels in said clusters;

segmenting said graph using a max-flow segmentation to obtain pixels of said image associated with said object;

preprocessing said image by resizing, smoothening, and diffusion filtering said image before said clustering step;

cropping from said image a region of interest associated with said object, before said clustering step; and integrating said region of interest back into said image after said segmenting step and restoring said image to original resolution.

9. The image processing method as recited in claim 8, wherein said clustering step, said generating step and said segmenting step are performed for pixels in said region of interest.

10. An image processing method, said method comprising:

accessing digital image data representing an image including an object;

clustering pixels of said image to obtain clusters;

generating a graph with pixels of said image and cluster membership information of pixels in said clusters; and segmenting said graph using an energy minimizing function, to obtain pixels of said image associated with said object, wherein said generating step includes said cluster membership information in said graph by assigning a high strength to edges between same-cluster pixels, wherein said same-cluster pixels belong to a cluster from said clusters, and assigns weights to edges between different-cluster pixels based on a gradient characteristic between said different-cluster pixels, wherein said different-cluster pixels belong to different clusters, and said segmenting step does not break said edges between said same-cluster pixels.

11. An image processing apparatus for object detection using at least one processor, said apparatus comprising:

an image data input unit in said at least one processor, for accessing digital image data representing an image including an object;

a clustering unit in said at least one processor, for clustering pixels of said image to obtain clusters; and a graph segmentation unit in said at least one processor, for identifying pixels of said image associated with said object, said graph segmentation unit identifying pixels by generating a graph with pixels of said image and cluster membership information of pixels in said clusters, and segmenting said graph using a max-flow segmentation to obtain pixels of said image associated with said object, wherein said graph segmentation unit
includes said cluster membership information in said graph by assigning a high strength to edges between same-cluster pixels, wherein said same-cluster pixels belong to a cluster from said clusters, and
does not break said edges between said same-cluster pixels when segmenting said graph.

12. An image processing apparatus for object detection using at least one processor, said apparatus comprising:
an image data input unit in said at least one processor, for accessing digital image data representing an image including an object;
a clustering unit in said at least one processor, for clustering pixels of said image to obtain clusters; and
a graph segmentation unit in said at least one processor, for identifying pixels of said image associated with said object, said graph segmentation unit identifying pixels by
generating a graph with pixels of said image and cluster membership information of pixels in said clusters, and
segmenting said graph using a max-flow segmentation to obtain pixels of said image associated with said object,
wherein said graph segmentation unit assigns weights to edges between different-cluster pixels based on a gradient characteristic between said different-cluster pixels, before segmenting said graph, wherein said different-cluster pixels belong to different clusters.

13. An image processing apparatus for object detection using at least one processor, said apparatus comprising:
an image data input unit in said at least one processor, for accessing digital image data representing an image including an object;
a clustering unit in said at least one processor, for clustering pixels of said image to obtain clusters; and
a graph segmentation unit in said at least one processor, for identifying pixels of said image associated with said object, said graph segmentation unit identifying pixels by
generating a graph with pixels of said image and cluster membership information of pixels in said clusters, and
segmenting said graph using a max-flow segmentation to obtain pixels of said image associated with said object,
wherein said clustering unit clusters pixels using k-means clustering, and
wherein said clustering unit performs k-means clustering by
representing pixels of said image in a 4-dimensional space using two parameters relating to spatial characteristics of said pixels in said image, a parameter relating to an intensity characteristic of said pixels in said image, and a parameter relating to a distance characteristic of said pixels in said image to a reference point, to obtain pixel representations, and
performing k-means clustering for said pixels of said image in said 4-dimensional space.

14. The apparatus according to claim 13, wherein said clustering unit performs k-means clustering with k=4 to obtain 4 said clusters.

15. An image processing apparatus for object detection using at least one processor, said apparatus comprising:
an image data input unit in said at least one processor, for accessing digital image data representing an image including an object;
a clustering unit in said at least one processor, for clustering, pixels of said image to obtain clusters; and
a graph segmentation unit in said at least one processor, for identifying pixels of said image associated with said object, said graph segmentation unit identifying pixels by
generating a graph with pixels of said image and cluster membership information of pixels in said clusters, and
segmenting said graph using a max-flow segmentation to obtain pixels of said image associated with said object,
wherein said graph segmentation unit selects a source pixel from among pixels of said image not included in said object, and a sink pixel from among pixels of said image included in said object, for inclusion of said source pixel and said sink pixel in said graph, and
wherein said graph segmentation unit assigns strengths to edges between said pixels in said graph, said sink pixel, and said source pixel, based on a distance characteristic.

16. The apparatus according to claim 15, wherein said graph segmentation unit includes said cluster membership information in said graph by
assigning a high strength to edges between same-cluster pixels, wherein said same-cluster pixels belong to a cluster from said clusters, and
assigning weights to edges between different-cluster pixels based on a gradient characteristic between said different-cluster pixels, wherein said different-cluster pixels belong to different clusters; and
segments a first group of pixels associated with said object and including said sink pixel, a second group of pixels not associated with said object and including said source pixel, without breaking said edges between said same-cluster pixels.

17. The apparatus according to claim 15, wherein
said image is a digital mammogram,
said object is a pectoral muscle in said digital mammogram,
said source pixel is a background pixel,
said sink pixel is a pixel of said pectoral muscle.

18. An image processing apparatus for object detection using at least one processor, said apparatus comprising:
an image data input unit in said at least one processor, for accessing digital image data representing an image including an object;
a clustering unit in said at least one processor, for clustering pixels of said image to obtain clusters;
a graph segmentation unit in said at least one processor, for identifying pixels of said image associated with said object, said graph segmentation unit identifying pixels by
generating a graph with pixels of said image and cluster membership information of pixels in said clusters, and
segmenting said graph using a max-flow segmentation to obtain pixels of said image associated with said object;
an image operations unit in said at least one processor, for preprocessing said image by resizing, smoothening, and diffusion filtering said image, before said clustering unit clusters pixels of said image;
a cropping unit in said at least one processor, for cropping from said image a region of interest associated with said object, before said clustering unit clusters pixels of said image; and an image restoration unit in said at least one processor, for integrating said region of interest back into said image and restoring said image to original resolution, after said graph segmentation unit identifies pixels of said image associated with said object.

19. The apparatus according to claim 18, wherein said clustering unit and said graph segmentation unit process pixels in said region of interest.

* * * * *